United States Patent
Wang et al.

(10) Patent No.: US 8,052,279 B2
(45) Date of Patent: Nov. 8, 2011

(54) LIGHT SOURCE MODULE AND PROJECTOR USING SAME

(75) Inventors: Pang-Cheng Wang, Taipei Hsien (TW); Jing-Miau Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 325 days.

(21) Appl. No.: 12/468,826

(22) Filed: May 19, 2009

(65) Prior Publication Data

US 2010/0220298 A1    Sep. 2, 2010

(30) Foreign Application Priority Data

Mar. 2, 2009  (CN) .......................... 2009 1 0300641

(51) Int. Cl.
G03B 21/14    (2006.01)

(52) U.S. Cl. .............. 353/31; 353/84; 353/94; 348/743; 348/771

(58) Field of Classification Search .................... 353/30, 353/31, 34, 37, 84, 94; 362/555, 561, 231, 362/800, 84; 385/133, 901; 348/742, 743, 348/771
See application file for complete search history.

(56) References Cited

U.S. PATENT DOCUMENTS

| | | | |
|---|---|---|---|
| 2,681,946 A * | 6/1954 | Leverenz | 348/742 |
| 7,168,810 B2 * | 1/2007 | Peterson et al. | 353/31 |
| 7,607,784 B2 * | 10/2009 | Shimaoka et al. | 353/85 |
| 2006/0114423 A1 * | 6/2006 | Maeda et al. | 353/94 |
| 2007/0019408 A1 * | 1/2007 | McGuire et al. | 362/231 |
| 2007/0165409 A1 * | 7/2007 | Shimaoka et al. | 362/299 |
| 2010/0085541 A1 * | 4/2010 | Chen | 353/31 |
| 2010/0283977 A1 * | 11/2010 | Wang et al. | 353/84 |
| 2010/0328632 A1 * | 12/2010 | Kurosaki et al. | 353/98 |

FOREIGN PATENT DOCUMENTS

CN    101131531 A    2/2008

* cited by examiner

*Primary Examiner* — William C Dowling
(74) *Attorney, Agent, or Firm* — Altis Law Group, Inc.

(57) ABSTRACT

The present disclosure provides a light source module including three light source units each comprising a light source and respectively emitting light of different color. At least one light source unit of the three light source units is a first light source unit. Each first light source unit further includes a rotatable light converter located on the light path of the light emitted from the light source The rotatable light converter is covered with fluorescent powder. The fluorescent powder is located on the light path of the light emitted from the light source, and configured for converting the emitted light from the light source into light of different color when the fluorescent powder is stimulated by the emitted light. The present disclosure also provides a digital light processing projector with the light source module.

10 Claims, 3 Drawing Sheets

LIGHT SOURCE MODULE AND PROJECTOR USING SAME

BACKGROUND

1. Technical Field

The present disclosure relates to projectors and, particularly, to a light source module for a digital light processing projector and a projector using the same.

2. Description of the Related Art

Digital Light Processing (DLP) technology is used in projectors and video projectors. In a projector with a single DLP chip, colors are produced by placing a color wheel between the lamp and the DLP chip. The color wheel is divided into multiple sectors, such as red, green, and blue. An image is created by microscopically small mirrors laid out in a matrix on a semiconductor chip, known as Digital Micromirror Device (DMD). The DLP chip is synchronized with the rotation of the color wheel so that some mirrors will reflect green light on the DMD when the green section of the color wheel is in front of a lamp. The same is true for the red and the blue. The colors are thus displayed sequentially at sufficiently frequency to generate a visibly composite "full color" image.

However, when the DLP projector is to project a white area, the white area is achieved by illuminating red, green, and blue light in turn, relying on temporary visual retention. The brightness of such a white area is generally insufficient.

What is needed, therefore, is a light source module and a projector using the same to overcome or at lease alleviate the described limitations.

BRIEF DESCRIPTION OF THE DRAWINGS

Many aspects of the present light source module and a projector using the light source module can be better understood with reference to the following drawings. The components in the drawings are not necessarily drawn to scale, the emphasis instead being placed upon clearly illustrating the principles of the present light source module and a projector using the light source module.

DETAILED DESCRIPTION

Embodiments of the present disclosure will now be described in detail with reference to the accompanying drawings.

Figure 1:
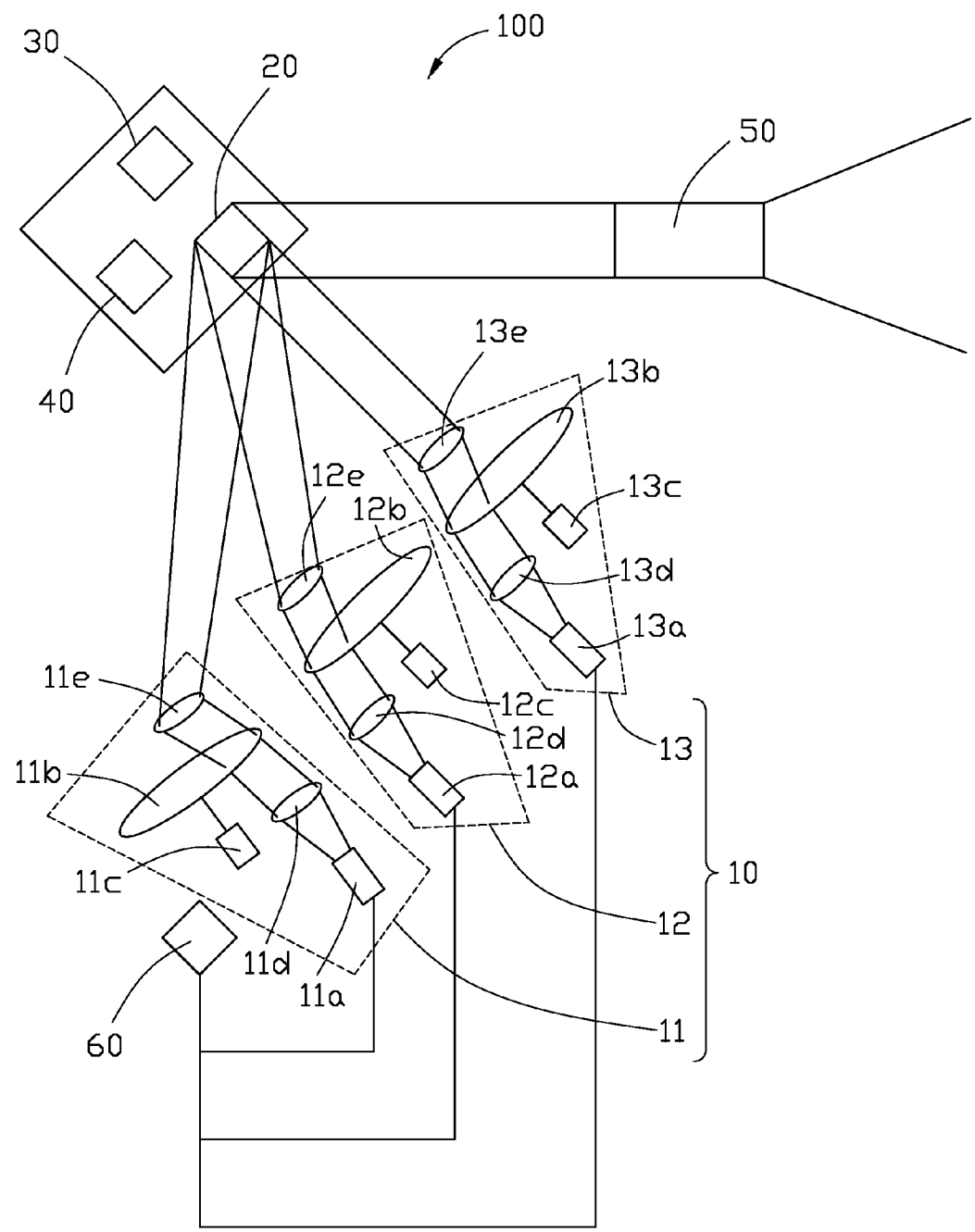
FIG. 1 is a schematic view of a first exemplary embodiment of a projector.

Referring to FIG. 1, a DLP projector 100, according to a first exemplary embodiment, is shown. The projector 100 includes a light source module 10, a DMD 20, a processor 30, a memory 40, a projection lens 50, and a controller 60. The light source module 10 includes a first light source unit 11, a second light source unit 12, a third light source unit 13.

The processor 30 transforms data of an image to RGB data. The RGB data is input to the memory 40 in order. The first light source unit 11, the second light source unit 12, and the third light source unit 13 are electrically coupled to the memory 40 and project different colors to the DMD 20 according to the RGB data received from the memory 40. The DMD 20 is electrically coupled to the memory 40 and reflects the different colors of light emitted from the first light source unit 11, the second light source unit 12, and the third light source unit 13 according to the RGB data from the memory 40. The projection lens 50 projects the light reflected from the DMD 20 onto a screen to form a color image.

The first light source unit 11 includes a first light source 11a, a first light converter 11b, a first motor 11c, a first light source condenser 11d, and a first light converter condenser 11e. The first light source condenser 11d, the first light converter 11b and the first light converter condenser 11e are located in the light path of the light emitted from the first light source 11a. The first light source 11a is a LED source. The light emitted from the first light source 11a can be red, blue, green, ultraviolet, blue-violet, or partially blue. Here, the first light source 11a emits ultraviolet light. The first light converter 11b is covered with fluorescent powder including rare earth three-band phosphors. Here, the fluorescent powder in the first light converter 11b emits red light when stimulated by the first light source 11a. The first light converter 11b is rotated by the first motor 11c to avoid being burnt down by the high-power light emitted from the first light source 11a. The first light source condenser 11d is positioned between the first light source 11a and the first light converter 11b and aligned with the first light source 11a for concentrating the light emitted from the first light source 11a to the first light converter 11b. The first light converter condenser 11e is located at the light emitting side of the first light converter 11b and faces the first light converter 11b for converging the light emitted from the first light converter 11b.

The second light source unit 12 includes a second light source 12a, a second light converter 12b, a second motor 12c, a second light source condenser 12d, and a second light converter condenser 12e. The arrangement of the elements of the second light source unit 12 is similar to that of the first light source unit 11, differing only in that the fluorescent powder on the second light converter 12b can emit green light when stimulated by the second light source 12a.

The third light source unit 13 includes a third light source 13a, a third light converter 13b, a third motor 13c, a third light source condenser 13d, and a third light converter condenser 13e. The arrangement of the elements of the third light source unit 13 is similar to that of the first light source unit 11, differing only in that the fluorescent powder on the third light converter 13b emits blue light when stimulated by the third light source 13a.

The controller 60 is electronically coupled to the processor 30 and turns the first light source 11a, the second light source 12a, and the third light source 13a on or off according to the RBG data of the image transformed by the processor 30. When a white area is to be projected, the controller 60 turns on the first light source 11a, the second light source 12a, and the third light source 13a at the same time, the white light combining three colors of light reflected at the same time. As a result, brightness of the white area is improved.

Figure 2:
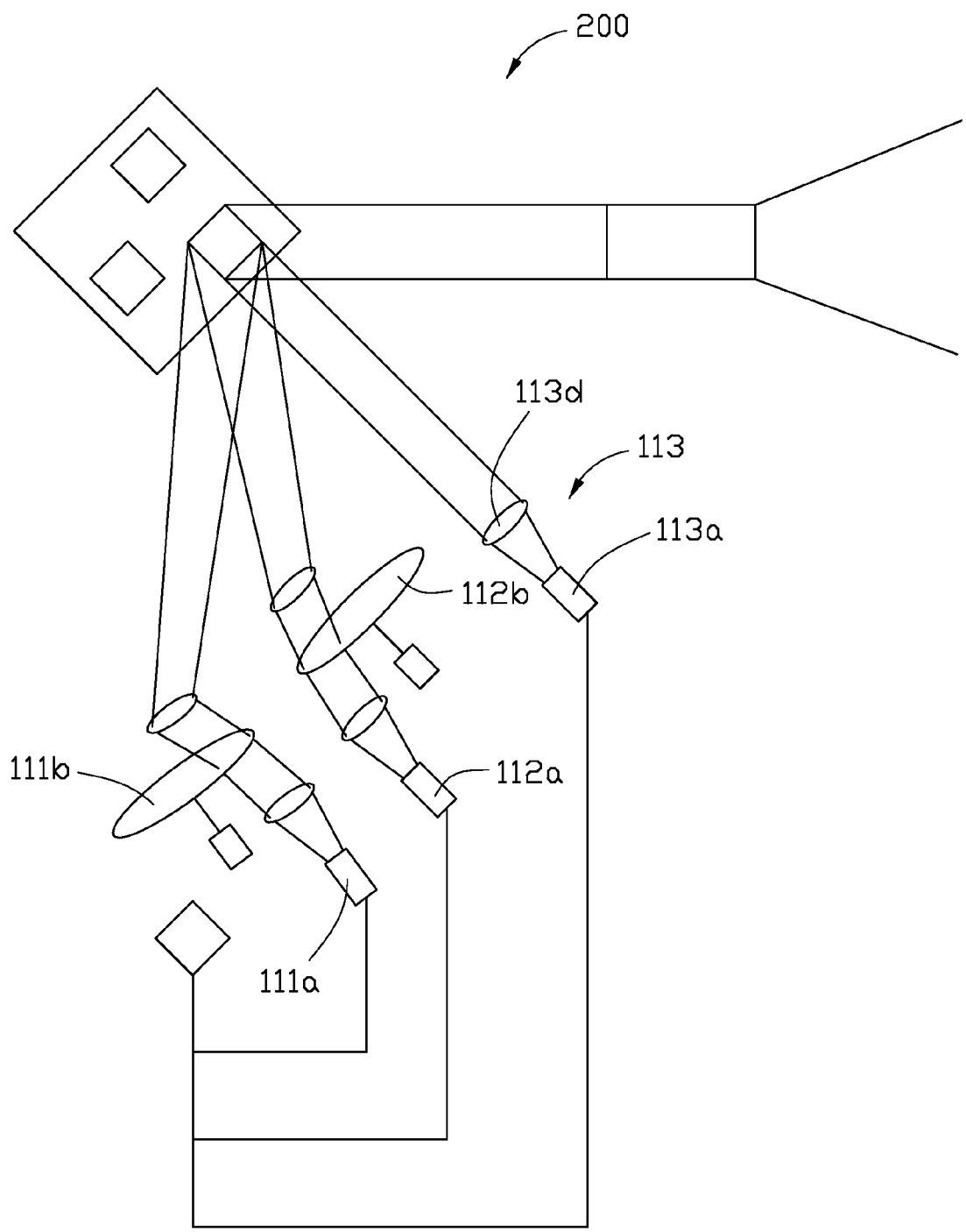
FIG. 2 is a schematic view of a second exemplary embodiment of a projector.

Referring to the FIG. 2, a projector 200, according to a second exemplary embodiment, is shown, differing from projector 100 of the first embodiment only in that a third light source unit 113 of the projector 200 includes only a third light source 113a and a third light source condenser 113d. Light emitted from the third light source 113a is red, blue, or green. The fluorescent powder disposed on a first light converter 111b and a second light converter 112b can emit different colors of light by a first light source 111a and a second light source 112a. The colors of the light emitted from the first light converter 111b and second light converter 112b are different from that of the third light source 113a. Here, the fluorescent powder disposed on the first light converter 111b can emit red light when stimulated by the first light source 111a. The fluorescent powder disposed on the second light converter 112*b* can emit green light when stimulated by second light source 112*a*. The third light source 113*a* emits blue light.

Figure 3:
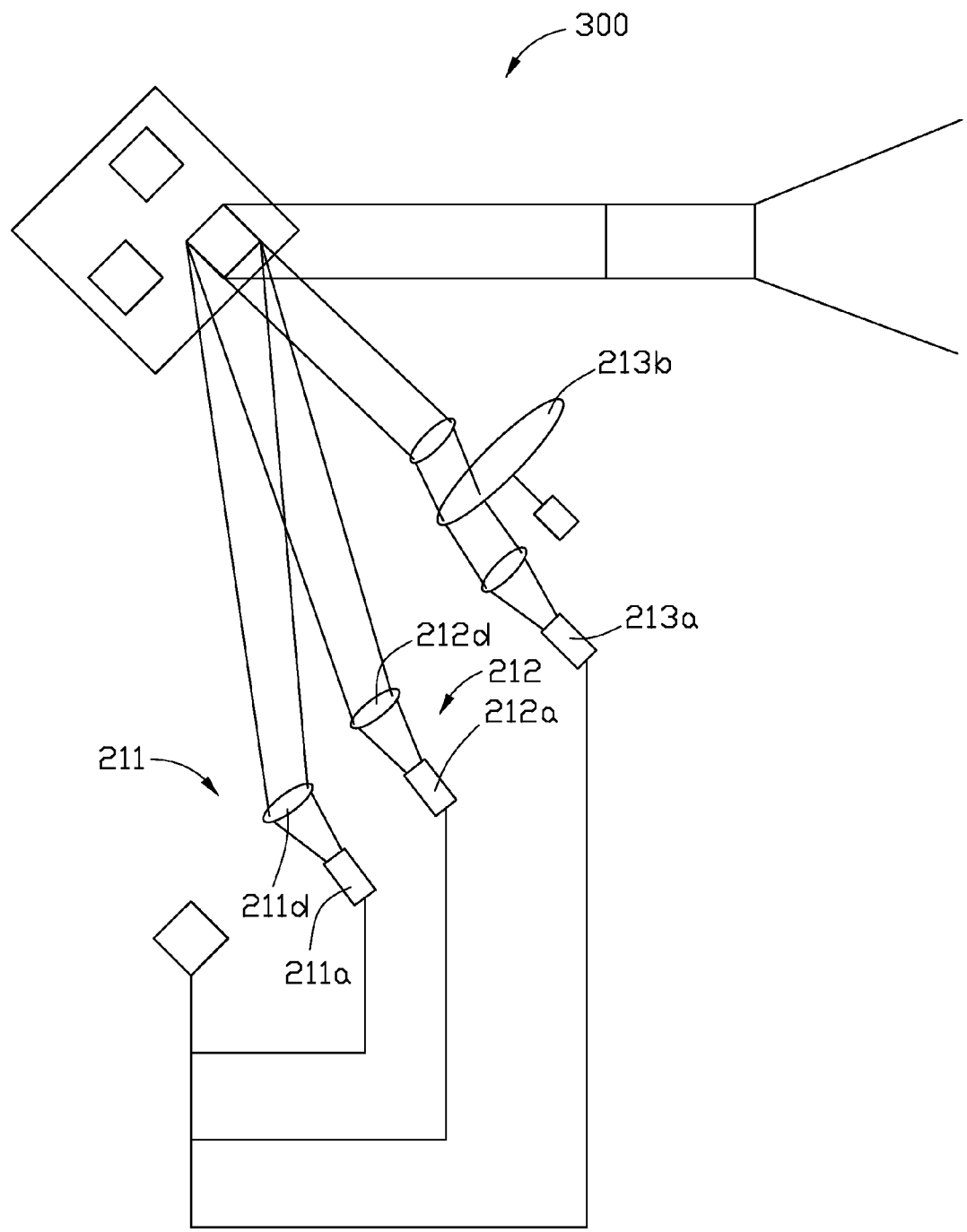
FIG. 3 is a schematic view of a third exemplary embodiment of a projector.

Referring to FIG. 3, a projector 300, according to a third exemplary embodiment, is shown, differing from projector 100 of the first embodiment only in that a first light source unit 211 of the projector 200 includes only a first light source 211*a* and a first light source condenser 211*d*, and a second light source unit 212 of the projector 200 includes only a second light source 212*a* and a second light source condenser 212*d*. The light emitted from the first light source 211*a*, the second light source 212*a*, and a third light source 213*a* of the projector 200 are two of red, blue, and green. Here, the first light source 211*a* emits red light. The second light source 212*a* and the third light source 213*a* both emit blue light, and the fluorescent powder disposed on the third light converter 213*b* can emit a light different from that of the first light source 211*a*. Here, fluorescent powder disposed on the third light converter 213*b* can emit green light when stimulated by the third light source 213*a*.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A digital light processing projector comprising:
 a light source module comprising three light source units each comprising a light source and respectively emitting light of different color, at least one light source unit of the three light source units being a first light source unit, each first light source unit comprising:
  a rotatable light converter located on the light path of the light emitted from the light source, the light converter being covered with fluorescent powder and configured for converting the emitted light from the light source into a light of a different color when the fluorescent powder is stimulated by the emitted light;
 a digital micromirror device, the light emitted from the three light source units directly projected to the digital micromirror device, the digital micromirror device reflecting the light emitted from the three light source units according to predetermined color data at the same time; and
 a projection lens projecting the light reflected from the digital micromirror device.

2. The digital light processing projector as claimed in claim 1, wherein the at least one first light source unit comprises one first light source unit.

3. The digital light processing projector as claimed in claim 1, wherein the at least one first light source unit comprises two first light source units.

4. The digital light processing projector as claimed in claim 1, wherein each light source unit is a first light source unit.

5. The digital light processing projector as claimed in claim 1, wherein the fluorescent powder covering the light converter comprises rare earth three-band phosphor.

6. The digital light processing projector as claimed in claim 1, wherein the light source is a light emitting diode.

7. The digital light processing projector as claimed in claim 1, wherein the light source emits blue light.

8. The digital light processing projector as claimed in claim 1, wherein the light source emits ultraviolet light.

9. The digital light processing projector as claimed in claim 1, wherein the predetermined color data are stored in a memory.

10. The digital light processing projector as claimed in claim 1, wherein the three light source units face the digital micromirror device.

\* \* \* \* \*